United States Patent
Schultz

(12) 
(10) Patent No.: US 10,132,298 B2
(45) Date of Patent: Nov. 20, 2018

(54) AVIATION BEACON DEVICE FOR A WIND TURBINE

(71) Applicant: WOBBEN PROPERTIES GMBH, Aurich (DE)

(72) Inventor: Olaf Schultz, Bremen (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 15/512,812

(22) PCT Filed: Sep. 16, 2015

(86) PCT No.: PCT/EP2015/071227
§ 371 (c)(1),
(2) Date: Mar. 20, 2017

(87) PCT Pub. No.: WO2016/046045
PCT Pub. Date: Mar. 31, 2016

(65) Prior Publication Data
US 2017/0284377 A1 Oct. 5, 2017

(30) Foreign Application Priority Data

Sep. 23, 2014 (DE) .................. 10 2014 219 212
Mar. 12, 2015 (DE) .................. 10 2015 204 459

(51) Int. Cl.
*B64D 47/00* (2006.01)
*G08G 5/00* (2006.01)
(Continued)

(52) U.S. Cl.
CPC .............. *F03D 80/10* (2016.05); *F21V 5/046* (2013.01); *F21V 23/003* (2013.01);
(Continued)

(58) Field of Classification Search
CPC .......... F03D 80/10; F21V 5/046; F21V 23/003
(Continued)

(56) References Cited

U.S. PATENT DOCUMENTS

| 3,858,041 A | 12/1974 | Hitchcock |
| 7,589,641 B2 | 9/2009 | Wobben |
| 8,636,388 B2 | 1/2014 | Röer |
| 2002/0093823 A1 | 7/2002 | Rohlfing et al. |
| 2009/0289804 A1 | 11/2009 | Carstensen et al. |

(Continued)

FOREIGN PATENT DOCUMENTS

| DE | 10225288 A1 | 1/2004 |
| DE | 202007005003 U1 | 8/2007 |

(Continued)

*Primary Examiner* — John A Tweel, Jr.
(74) *Attorney, Agent, or Firm* — Seed Intellectual Property Law Group LLP

(57) ABSTRACT

An aircraft beacon device of a wind power installation, to be arranged on a gondola of the wind power installation, comprising at least three omnidirectional emission sections arranged concentrically in a ring around a common mid-axis, each omnidirectional emission section comprising a lens section arranged concentrically in a ring around the mid-axis, with a beam plane defined perpendicularly to the mid-axis, and at least one lighting ring having lighting means arranged concentrically in a ring around the mid-axis in order to emit light through the lens section, wherein each lighting ring is configured in order to emit light with a central emission direction which makes an emission angle with the beam plane, and wherein the emission direction depends on an axial position of the lighting ring with respect to the lens section, wherein at least one omnidirectional emission section comprises at least two lighting rings offset axially with respect to one another for emission with different emission angles.

16 Claims, 7 Drawing Sheets

(51) Int. Cl.
  *F03D 80/10*   (2016.01)
  *F21V 5/04*   (2006.01)
  *F21V 23/00*   (2015.01)
  F21W 111/00   (2006.01)
  F21Y 103/33   (2016.01)
  F21Y 115/10   (2016.01)
  F21Y 113/13   (2016.01)
(52) U.S. Cl.
  CPC ...... *F05B 2240/14* (2013.01); *F21W 2111/00* (2013.01); *F21Y 2103/33* (2016.08); *F21Y 2113/13* (2016.08); *F21Y 2115/10* (2016.08); *Y02E 10/72* (2013.01)
(58) Field of Classification Search
  USPC .......................................................... 340/983
  See application file for complete search history.

(56) References Cited

U.S. PATENT DOCUMENTS

2013/0278445 A1    10/2013  Quell et al.
2016/0169501 A1*   6/2016   Cryan .................... F03D 80/10
                                                        416/5

FOREIGN PATENT DOCUMENTS

| DE | 102010027527 A1 | 1/2012 |
| EP | 23201262213876 A1 | 8/2010 |
| EP | 2320126 A1 | 5/2011 |
| JP | 2011-528413 A | 11/2011 |

* cited by examiner

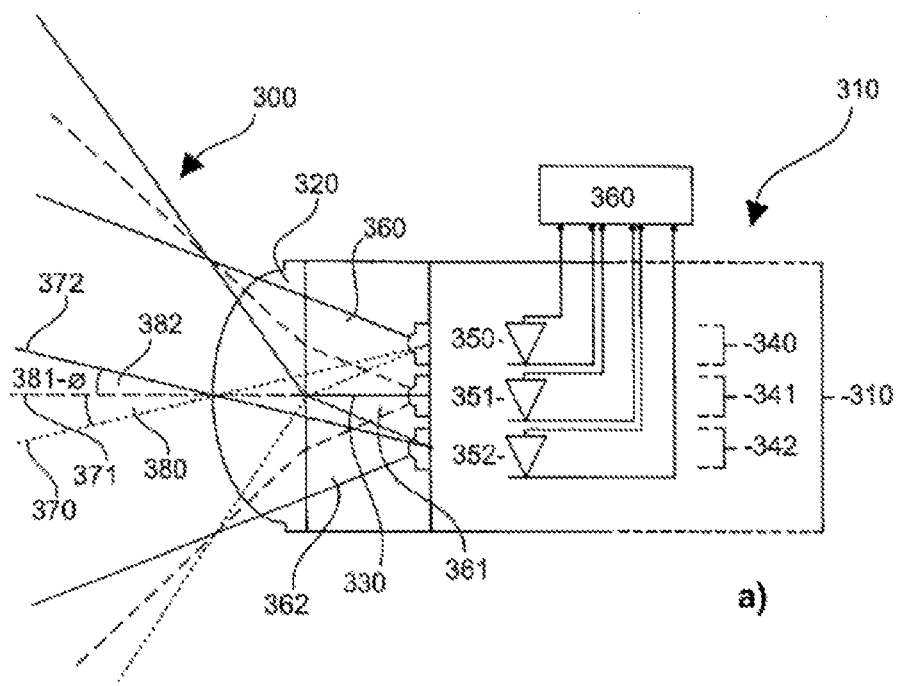
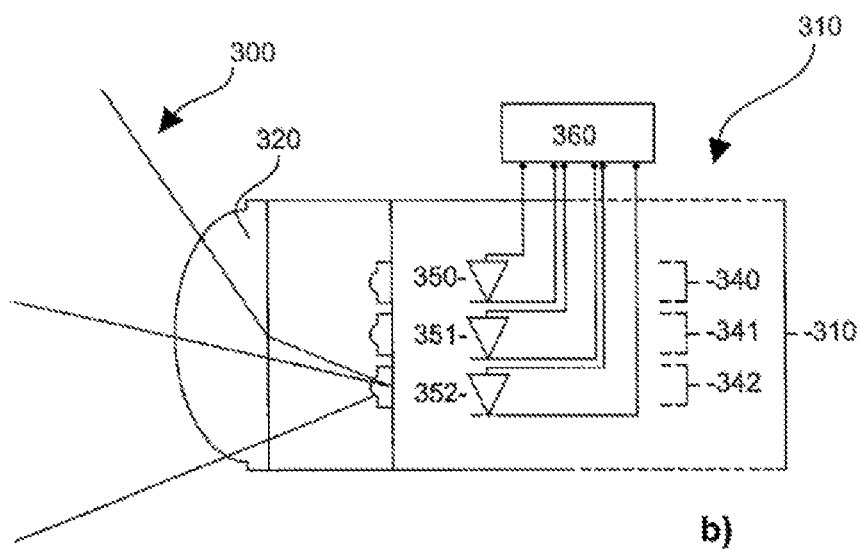
Fig. 3

AVIATION BEACON DEVICE FOR A WIND TURBINE

BACKGROUND

Technical Field

The present invention relates to an aircraft beacon device of a wind power installation, to be arranged on a nacelle and/or on the tower of the wind power installation. The present invention furthermore relates to a wind power installation comprising such an aircraft beacon device and to a method for operating such an aircraft beacon device.

Description of the Related Art

Wind power installations, which generate electricity from wind and feed this into an electrical supply network, are widely known. An example of such a wind power installation is represented schematically in FIG. 1.

Modern wind power installations conventionally comprise an aircraft beacon device, i.e., a device for forming a beacon on a wind power installation. For most wind power installations, because of the structural height, such devices are mandatory, their purpose being to warn air traffic, in particular the pilots, of aviation obstacles, such as a wind power installation, by sending out light signals or radio signals. Depending on the location and the standards and laws in force there, air beacon devices are subject to a wide variety of requirements, particularly in terms of the vertical emission angle, the flashing frequency and the intensity and wavelength of the signal.

It would be desirable for the signal sent out to reach only where the signal is intended, and as far as possible not to pollute the environment.

For example, U.S. Pat. No. 3,858,041 discloses a mechanical apparatus with which emission downwards to the ground is prevented or reduced. Inter alia, this prevents people from being distracted, in particular dazzled, by the signal of the aircraft beacon device. The disadvantage of this solution is above all the complexity of the mechanical configuration.

The German Patent and Trade Mark Office has investigated the following prior art in the priority application of the present application: DE 10 2010 027 527 A1 and DE 20 2007 005 003 U1.

BRIEF SUMMARY

Provided is an aircraft beacon device which does not require an additional mechanical apparatus for controlling the emission of a signal. At least, an alternative solution to that previously known is intended to be provided.

Thus, an aircraft beacon device of a wind power installation, to be arranged on a nacelle of the wind power installation, is provided, which comprises at least three omnidirectional emission sections arranged concentrically in a ring around a common mid-axis. Each omnidirectional emission section comprises a lens section arranged concentrically in a ring around the mid-axis, with a beam plane defined perpendicularly to the mid-axis, and at least one lighting ring having lighting arranged concentrically in a ring around the mid-axis in order to emit light through the lens section. Each lighting ring is configured in order to emit light with a central, vertical emission direction which makes an emission angle with the beam plane, and the emission direction depends on an axial position of the lighting ring with respect to the lens section. At least one of the omnidirectional emission sections comprises at least two lighting rings offset axially with respect to one another for emission with different emission angles.

Because of the annular structure of the aircraft beacon device due to the omnidirectional emission sections, the aircraft beacon device is configured to emit light in a 360° horizontal direction. All the omnidirectional emission sections are arranged around the same concentric axis and in the intended way above one another. When they each have the same external diameter, they therefore form an approximately cylindrical structure. In principle, however, they may also have different diameters.

An omnidirectional emission section is therefore an annular arrangement having a lens section and one or more lighting rings.

The lens section is, in particular, fully circumferential and may, for example, be formed as a drum lens, in particular made of an optically transmissive weatherproof material such as plastic or glass. The lens sections of all the omnidirectional emission sections together may at the same time form a housing or housing section of the aircraft beacon device. A lens section may be composed of two or more interconnected lens subsections. Such lens subsections may for example be lens rings with different diameters, which are fitted into one another. The specific structure also depends on the selected lighting means.

The lighting means, for example light-emitting diodes, emit radially outwards through the lens section. The lighting means do not in this case output a single beam, but output the light in a range. After the light has passed through the lens, or the lens section, it has a central beam direction. This is characterized by an emission angle which is defined in relation to the beam plane. As intended, i.e., when the aircraft beacon device is set up in such a way that the mid-axis extends perpendicularly, the beam plane is a horizontal plane. The emission angle is a vertical angle relative thereto.

Then, when the central emission direction is horizontal, the emission angle is 0°. If the central emission direction is directed upwards, the emission angle is positive, otherwise it is negative.

The emission direction is determined, in particular, by the way in which the lighting means are oriented in relation to the lens, which here for simplicity means the respectively active part of the lens section. Expressed in a simplified way, a lighting means or a lighting ring which lies in the beam plane leads to approximately horizontal emission, i.e., to an emission angle of 0°. If the lighting means or the lighting ring lies below the beam plane, the emission is then upward, otherwise it is downward. This can also be influenced by a central beam direction of the respective lighting means.

As a result, the central emission direction outwards is determined by the corresponding arrangement of the lighting means behind their lens. This vertical direction respectively relates in principle to the entire lighting ring. The emission direction may then be selected by corresponding driving of the lighting means. When a plurality of lighting rings of an omnidirectional emission section are driven, the emission directions may also be superimposed. The emission characteristic can be influenced in this way.

Each omnidirectional emission section may be formed differently. Many different emission characteristics can be generated by corresponding combination of the omnidirectional emission sections and their lighting rings.

The lens section, in particular the two opposing transparent light-refracting surfaces of the lens section, is in this case configured so that the emission characteristic of the lens section depends both on the axial position of the lighting ring with respect to the lens section and on the optical shape of the lens section itself.

By at least one omnidirectional emission section, which comprises at least two, preferably three or four, lighting rings, which are offset with respect to one another axially, i.e., along the mid-axis, the aircraft beacon device is configured to emit the light to be emitted in a different emission angle compared with omnidirectional emission sections having only one lighting ring. In particular, the omnidirectional emission sections of the aircraft beacon device are arranged in the axial direction with respect to one another. By arrangement of the omnidirectional emission sections with respect to one another in the axial direction, they are arranged above one another during intended use.

Preferably, the lighting means of the aircraft beacon device are LEDs.

By the use of LEDs, i.e., light-emitting diodes, as lighting means, the aircraft beacon device can make do with a relatively small overall size. Furthermore, LEDs have a longer lifetime as well as lower electricity consumption compared with conventional lighting means. Particularly in an embodiment of the aircraft beacon device as a flashing light, the practically inertialess modulability and switchability of an LED are advantageous.

Preferably, the aircraft beacon device is configured in such a way that at least one or some of the lighting means are configured in order to output light with a first color, in particular red, and at least one further or some further of them are configured in order to output light with a second color, in particular white, particularly in that a lighting ring for emitting one color is respectively provided.

By the use of at least two lighting means with different colors from one another, the aircraft beacon device is configured for at least a first and at least a second operating mode. Preferably, the color red is configured for the first operating mode and the color white is configured for the second operating mode, so that the aircraft beacon device fulfils both the statutory requirements of red emission for a night beacon and the statutory requirements of white emission for a daytime beacon. In particular, the lighting means are arranged in such a way that entire lighting rings of a first color, in particular red, and of a second color, in particular white, are configured in order to make selective driving of the individual colors advantageous. It is also conceivable to emit status signals of the aircraft beacon device with a third color, for example green.

A particularly advantageous embodiment is characterized in that at least some of the lighting means are formed as red LEDs and have a minimum intensity with a value from the following list: 10 cd, 20 cd, 25 cd, 30 cd, 32 cd, 32.5 cd, 50 cd, 70 cd, 100 cd, 200 cd or 2000 cd.

By the use of red LEDs which have a minimum intensity with one of the values mentioned above, it is in particular possible by an expedient combination of LEDs to implement the requirements of the regulator for a night beacon by the use of, in particular economical, standard red LEDs.

Another particularly preferred embodiment is characterized in that at least some of the lighting means are formed as white LEDs and have a minimum intensity with a value from the following list: 3.4 cd, 34 cd or 175 cd, which describes photometric values or peak values, and the effective intensity is therefore 2 cd, 20 cd or 100 cd.

By the use of white LEDs which have a minimum intensity with values of 20 000 cd, 50 000 cd, 100 000 cd or 200 000 cd, it is in particular possible by an expedient combination of LEDs to implement the requirements of the regulator for a daytime beacon by the use of, in particular economical, standard white LEDs.

Preferably, the aircraft beacon device comprises a control unit which is configured to vary the emission characteristic of the aircraft beacon device by selective driving of individual lighting means, lighting means groups or lighting rings.

The control unit is configured in such a way that it drives, in particular switches on and off, each individual lighting means, or lighting groups or lighting rings, and thereby adjusts an emission characteristic of the aircraft beacon device. The control unit is in this case configured in order to drive up to 600 or more lighting means selectively. The term "lighting groups" refers, for example, to neighboring lighting means and/or sections of lighting rings. Owing to the fact that the lighting means and/or lighting groups and/or lighting rings are driven selectively, the aircraft beacon device is configured for a multiplicity of different emission characteristics. The emission characteristic which can be influenced in this way comprises, in particular, the parameters: emission intensity, color, emission angle, both horizontally and vertically, and therefore also an emission range distance. This can be achieved by corresponding driving of the lighting means, lighting groups and/or lighting rings.

Furthermore, the control unit of the aircraft beacon device is characterized in that the control unit has emission characteristics which are programmed in a fixed manner.

Emission characteristics programmed in a fixed manner may be intended to satisfy the general requirements of the regulator which are in force at the location of the wind power installation by programming. It is therefore possible to use the same aircraft beacon devices for different regions or countries but with different programming. It is therefore not necessary to manufacture a large number of individually different aircraft beacon devices, but instead one may possibly be sufficient for many countries. These emission characteristics programmed in a fixed manner are programmed before the aircraft beacon device is arranged on the nacelle, or are reprogrammed after a change in the laws and/or the requirements in force at the location.

Preferably, the control unit of the aircraft beacon device can in this way be modified during operation of the installation, in particular as a function of events.

By the event-dependent adjustment of emission characteristics, it is possible to adapt the aircraft beacon device flexibly to situations and to optimize it. For example, it is proposed that, only in the event of an approaching aircraft, the aircraft beacon is adapted to this aircraft in terms of its vertical and horizontal emission characteristic. The aircraft beacon device then needs, for example, only to emit in the direction of the aircraft. In this way, influences on the environment can also be reduced, because as little light as possible is thus emitted and can therefore be less polluting.

On the other hand, an approaching flock of birds may be deliberately dazzled and made to turn away, or a part of the aircraft beacon is formed and driven in such a way that it could be used as orientation for migratory birds.

According to one embodiment, an aircraft beacon device is proposed which is characterized in that at least one emission characteristic is implemented in a fixed manner. It has been found that, in many cases, switching over is not necessary and rather, by suitable selection of the emission characteristic, the latter can be specified in a fixed way.

It is favorable to provide adaptation to different local requirements in a fixed way. Such requirements are often legal stipulations and may be implemented in a fixed way when the wind power installation is set up and the aircraft beacon is installed. It is therefore possible to provide a universal aircraft beacon device for many different locations, ideally for every location in the world, for which it is then only necessary to implement at the respective location its emission characteristic.

This relates in particular to the red emission characteristic, i.e., the night beacon, for which there may be very different regulations.

The implementation of the at least one fixed characteristic may be carried out by hardware measures, such as the disconnection of unrequired supply or control lines, or corresponding switches may be provided. It is, however, also conceivable to provide the fixed implementation using a controller.

Preferably, at least one emission characteristic implemented in a fixed manner is provided, which essentially emits only upwards, particularly in such a way that the aircraft beacon device does not emit downwards when used as intended on the wind power installation. This is based on the discovery that an only upward emission characteristic, i.e., up from a horizontal plane, is sufficient for safety of the air traffic. Disturbances for the population and/or the road traffic can be reliably and permanently prevented in this way. Incorrect programming is also avoided by this. Instead of a variable characteristic which offers the possibility of switching off light emitted downwards when it causes pollution and is not required, it is now proposed in principle to provide no emission in the lower region. Adaptation to different situations is avoided, so that incorrect switching is also avoided, and it is nevertheless sufficient for air safety.

Such an only upward emission characteristic is advantageously achieved by a structure according to at least one embodiment described above. In particular, arrangement of the lighting rings relative to the corresponding lens section straightforwardly provides this possibility of producing such an emission characteristic. It is not necessary to provide a special configuration of the lens, or a cover or the like.

Another embodiment provides an aircraft beacon device which is characterized in that at least one emission characteristic implemented in a fixed manner has a lower emission angle of at least −5°, in particular about −2°, the luminous intensity below this lower emission angle being less than 10%, in particular less than 5% of the maximum luminous intensity of the emission characteristic. This is preferably provided for an emission characteristic which essentially emits upwards, i.e., is only very weak in the range below −5° or −2°. It should be noted that even a value significantly lower than the maximum luminous intensity occurring in the emission characteristic may be perceived as significant and therefore even reduction of the luminous intensity for an emission angle of 0° to 60% can be regarded as emission upward.

Preferably, it is therefore proposed that the luminous intensity below an emission angle of 0° is less than 70%, preferably less than 60%, in particular less than 50% of the maximum luminous intensity of the emission characteristic, and in particular decreases further with lower emission angles. For illustration, reference is also made here to FIG. 7, which will be described below.

Preferably, the aircraft beacon device emits only upwards, a sharp delimitation being scarcely possible, or possible only with difficulty. It has, however, been found that in order to avoid polluting light on the ground it is sufficient for only small amounts of the light, i.e., only a small luminous flux, to reach the ground. A small fraction may therefore be permitted.

According to one embodiment, there are at least two emission characteristics implemented in a fixed manner, of which a first is intended for a red night beacon and a second for a white daytime beacon. These two emission characteristics implemented in a fixed manner may also be identical, although they differ in intensity and naturally in color.

An aircraft beacon device is also provided which has a rod-shaped main body to be fed horizontally through a tower of the wind power installation from the inside outwards, in particular through a corresponding bore in the tower, i.e., in its tower wall, or to be arranged externally on the tower, and a lighting section for emitting light for warning aircraft, the lighting section being configured in order to illuminate only a region above a horizontal plane in which the aircraft beacon device is arranged.

It has been found that a large proportion of polluting effects of aircraft beacons of wind power installations come from lighting of the tower, and often not or not only from the aircraft beacon on the nacelle. It is therefore proposed to arrange these aircraft beacons on the tower in such a way that they emit only horizontally and upwards, so as to avoid polluting effects particularly for the population and the road traffic. This can be achieved by rod-shaped lights which are inserted from the inside outwards through the tower, or they are fitted directly on the outside.

According to one embodiment, the aircraft beacon device is characterized in that infrared lighting means are provided in order to emit infrared light, particularly in that at least one lighting ring comprises infrared lighting means, in particular infrared LEDs. Such an aircraft beacon device can also, or particularly well, warn aircraft which are operating with night vision devices, and which particularly at night may find it difficult to see red warning lights.

Such infrared lighting means may in particular be provided as at least one lighting ring, or supplement a lighting ring, i.e., they may be arranged between other lighting means. To this end, infrared LEDs may in particular be provided between other LEDs, in particular red LEDs. The red and infrared lighting means may then be operated simultaneously and aircraft or pilots with or without a night vision device can simultaneously be made aware of the obstacle. This combination of red and infrared lighting means is proposed in principle for every embodiment.

Preferably, a wind power installation is provided with at least one aircraft beacon device according to one of the embodiments above.

By the configuration of a wind power installation with at least one aircraft beacon device, the wind power installation can essentially be identified by day and during the night as an air obstacle. Preferably, for permanent illumination in a 360° horizontal direction, a wind power installation is configured with at least two aircraft beacon devices. For example, the second aircraft beacon device illuminates the sectors in which no illumination by the first aircraft beacon device takes place, for example because of defective lighting means and/or shadowing by a rotor blade illuminated by the first aircraft beacon device.

Particularly because a rotor blade may partially and temporarily cover an aircraft beacon device during its movement in each case, a second aircraft beacon device is often provided. Where covering by a rotor blade cannot occur, i.e., expressed in a simplified way behind it, the two aircraft beacon devices do not need to emit doubly. There, for example, they may respectively not emit in a 90° sector. This can be achieved by preprogrammed fixed adjustment.

Preferably, a method for operating an aircraft beacon device according to one of the embodiments explained above is provided, wherein the lighting means are driven in such a way that a predetermined emission characteristic is generated and/or is switched on and/or off in a predetermined sector.

According to another embodiment, it is proposed to drive only some lighting means of a lighting ring, for example only every other, so as to reduce the emission intensity.

The method proposes, in particular, to control emission characteristics of the aforementioned aircraft beacon devices, in particular when they are operated on a wind power installation.

The lighting means may be driven in such a way that a predetermined emission characteristic, for example programmed in a fixed manner, is generated, the predetermined emission characteristic being called up for example from an electronic read-only memory. It is also possible to switch individual predetermined sectors of the emission characteristic on and/or off, for example at a particular time.

According to one embodiment, the property of the emission of the aircraft beacon device may be adjusted or modified during continuous operation by corresponding driving of the lighting means and/or lighting rings.

In order to allow effective control of the aircraft beacon device for many locations and/or events, the lighting means, lighting groups and/or lighting rings are also driven in such a way that the emission characteristic of the aircraft beacon device can thereby be modified during continuous operation, for example in the event of an approaching aircraft. This may, for example, be achieved by switching on and/or off.

It is furthermore proposed to adjust or vary a vertical emission characteristic, a horizontal sector for emission and/or an emission intensity during continuous operation, in particular as a function of an event and/or a period of time or point in time.

By the detection of an event, for example by a sensor connected to the aircraft beacon device, the emission characteristic of the aircraft beacon device is modified or adjusted for a period of time, for example for the duration of a flyover of an aircraft, or beyond a point in time, for example at a particular time of day or night. In this case, according to one embodiment, it is possible to change over between a first emission characteristic of a red night beacon, implemented in a fixed manner, and a second emission characteristic of a white daytime beacon, implemented in a fixed manner.

Preferably, an emission characteristic is specified by establishing the driving of the lighting means, in particular lighting rings, before the aircraft beacon device is put into operation. According to one embodiment, a fixed emission characteristic or a plurality of fixed emission characteristics are implemented before the aircraft beacon device is put into operation. The device may thus be manufactured universally but adapted at the installation location to the local situation and/or local regulations, and incorrect driving is avoided. In particular, incorrect driving such as is required at different locations but is undesirable or even unallowable at the specific location is avoided.

According to one embodiment, it is also proposed to adjust or vary the emission characteristic in the horizontal direction, in particular by sectors. For example, near an airfield, the emission characteristic, in particular also the emission, in a direction towards the airfield is provided in a different way than in a direction away from the airfield, because starting aircraft come from the one direction and landing aircraft from the other direction. If the aircraft beacon device is installed on a nacelle of a wind power installation, however, the horizontal orientation of the aircraft beacon device changes with the azimuthal setting of the wind power installation. It is therefore proposed to drive the aircraft beacon device as a function of the azimuthal position of the nacelle, and in particular to adapt an emission characteristic varying in the horizontal direction according to the azimuthal position.

BRIEF DESCRIPTION OF THE SEVERAL VIEWS OF THE DRAWINGS

The present invention will now be explained in more detail below by way of example with the aid of exemplary embodiments with reference to the appended figures.

FIG. 3 shows a schematic representation of emission characteristics of an aircraft beacon device according to one embodiment.

DETAILED DESCRIPTION

Figure 1:
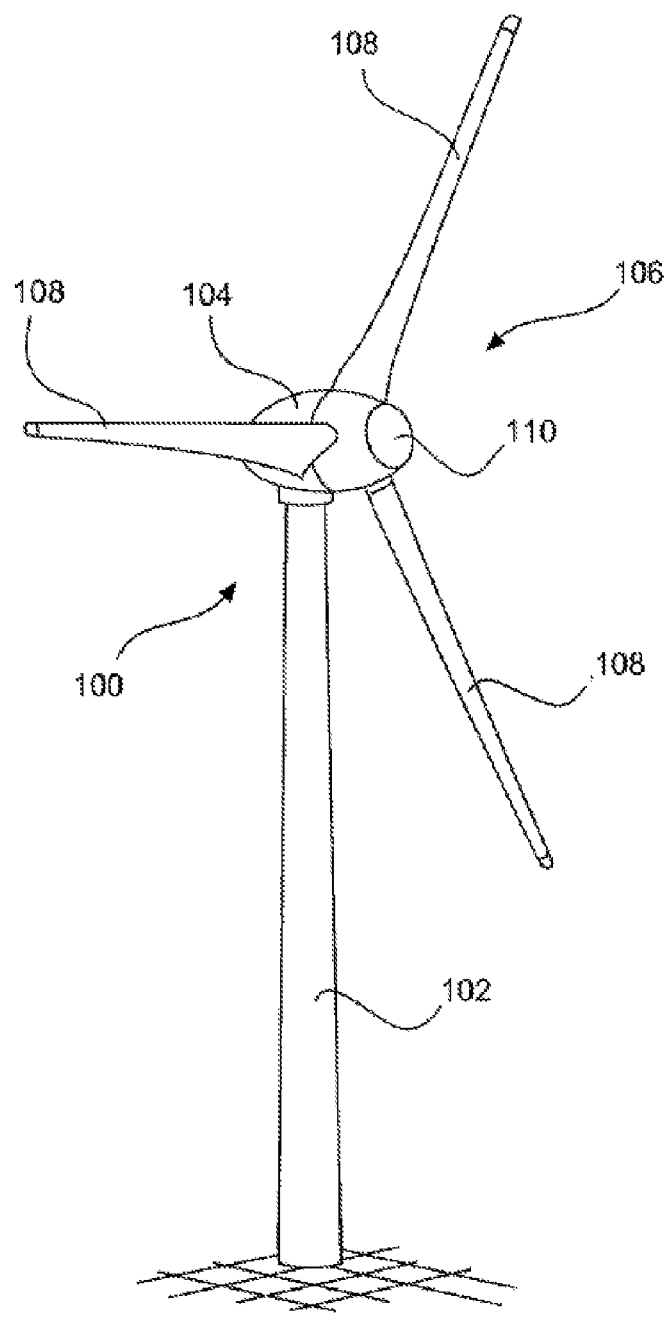
FIG. 1 shows a schematic representation of a wind power installation.

FIG. 1 shows a wind power installation 100 having a tower 102 and a nacelle 104. A rotor 106 having three rotor blades 108 and a spinner 110 is arranged on the nacelle 104. During operation, the rotor 106 is set in rotational movement by the wind and thereby drives a generator in the nacelle 104. An aircraft beacon device 101 is arranged on the nacelle 104, although as an alternative two aircraft beacon devices 101 may for example also be provided.

Figure 2:
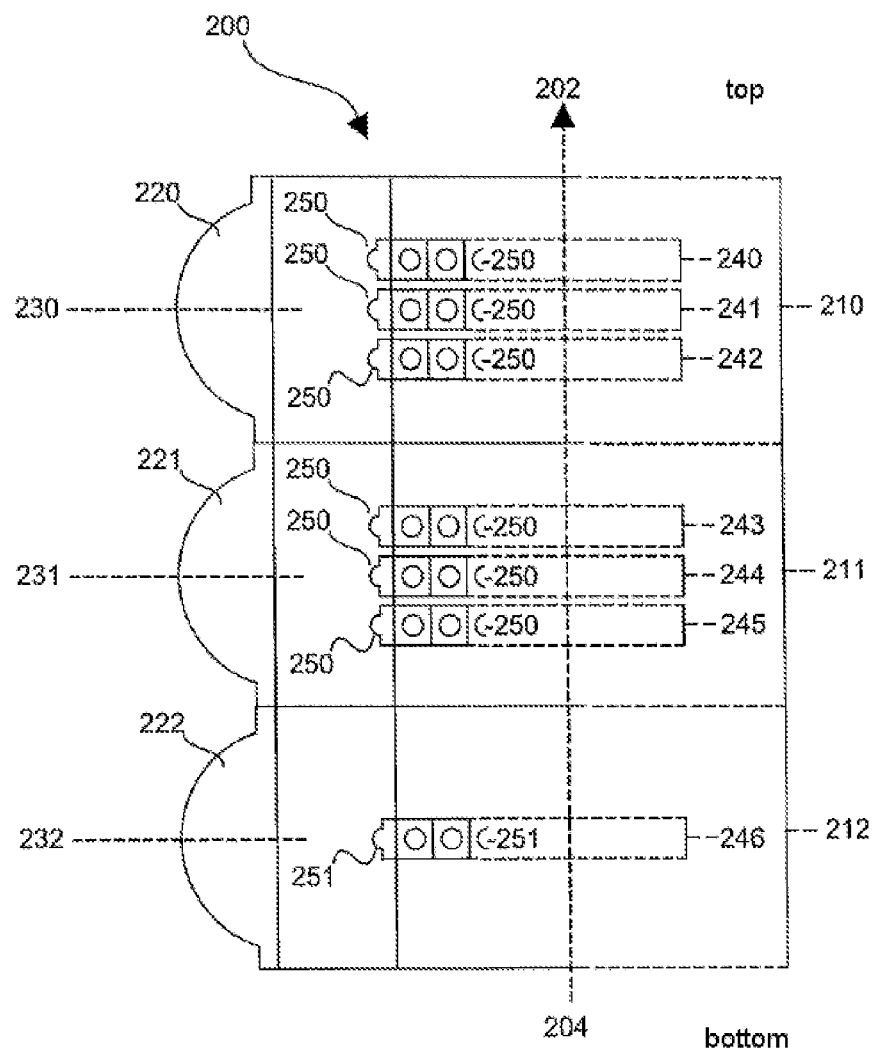
FIG. 2 shows a schematic representation of an aircraft beacon device according to one embodiment.

FIG. 2 shows an aircraft beacon device 200, which has three omnidirectional emission sections 210, 211 and 212 arranged in a ring and concentrically with respect to one another in the axial direction 202 around a mid-axis 204. The omnidirectional emission sections 210, 211 and 212 respectively comprise a fully circumferential lens section 220, 221 and 222, each of the lens sections 210, 211 and 212 defining a beam plane 230, 231 and 232. The omnidirectional emission sections 210 and 211 have three fully circumferential lighting rings 240, 241 and 242, and 243, 244 and 245, respectively. They have white LEDs 250 arranged in a ring concentrically around the mid-axis 204. The three lighting rings 240, 241 and 242, and 243, 244 and 245, respectively, are axially offset with respect to one another. The lowermost omnidirectional emission section 212 has only one lighting ring 246 of red LEDs 251.

To this extent, FIG. 2 shows a part of the aircraft beacon device 200 in a partially sectional schematic partial view. The representation of FIG. 2—the same applies for the subsequent FIG. 3—is intended in particular possible emission characteristics in relation to the vertical direction is respectively a central lighting ring 241 or 244 at the height of the relevant beam plane 230 or 231. A lighting ring 240 or 243 is respectively arranged higher, and yet another lighting ring 242 or 245 is respectively arranged lower. The two omnidirectional emission sections 210 and 211 are represented identically in FIG. 2, although different configurations could also be provided. For example, the lens sections 220 and 221 could be formed in a different way. A different number of lighting rings may be provided, for example only two lighting rings in the upper omnidirectional emission section 210. The lighting rings 240, 241 and 242 of the omnidirectional emission section 210, on the one hand, may also have different spacings from one another in comparison with the spacings of the lighting rings 243, 244 and 245 of the omnidirectional emission section 211. In this way, different emission characteristics may respectively be achieved by the two omnidirectional emission sections 210 and 211. In this way, a very large number of different emission characteristics may be characterized by superposition of the emission characteristics of the two omnidirectional emission sections 210 and 211.

It should also be pointed out that the vertical spacing, i.e., the spacing in the direction of the mid-axis 204, or in the axial direction 202, is no longer relevant for a distant observer, i.e., for example the pilot of an aircraft. Rather, it is much more important that different characteristics can be generated.

The omnidirectional emission sections 210 and 211 may also be provided in order to satisfy very different requirements for emission characteristics. It is even conceivable for two different regions, or even two different countries, to place different requirements on the emission characteristics such that only the use of one omnidirectional emission section, for example the omnidirectional emission section 210, is envisaged for one region or one country, and only the operation of the omnidirectional emission section 211 is envisaged for the other region or the other country. Often, however, a combination of a plurality of omnidirectional emission sections is conceivable.

The omnidirectional emission section 212 of the example of FIG. 2 comprises only the one lighting ring 246, which has red LEDs 251. These red LEDs, or the red lighting ring, are intended for nighttime operation and therefore often make do with less flexibility in terms of their emission direction. In particular, such red light-emitting diodes, or in general red lighting, of aircraft beacon devices are less dazzling and can also be seen easily even without a special beam direction because of the dark background. A single lighting ring may therefore be sufficient. This is also presented only for illustration, and in particular to illustrate that an aircraft beacon device may contain a plurality of omnidirectional emission sections 210, 211 and 212, which may be formed in a different way.

Correspondingly, the representation of FIG. 2 also shows that, it is possible to achieve different emission characteristics by superposition, which, besides emission direction and intensity, also involves a superposition or combination or variation in terms of the light color.

FIG. 3 shows the emission characteristic 300 of an omnidirectional emission section as represented in FIG. 2. The omnidirectional emission section 310 comprises a lens section 320 and three lighting rings 340, 341 and 342, represented by an LED 350, 351 and 352, respectively. The individual LEDs 350, 351 and 352 are driven selectively and according to requirement by the control unit of the aircraft beacon device 360. Owing to the fact that the lighting rings 340, 341 and 342 are arranged offset axially with respect to one another, the three lighting rings 340, 341 and 342 respectively have a different emission characteristic. This is illustrated by the emission characteristic 301, which shows the omnidirectional emission section 310 after selective driving, only the lighting ring 342, or LED 352, being driven.

The omnidirectional emission section 310 shown by way of example could, for example, be identical to the omnidirectional emission section 210 of FIG. 2, and correspondingly form a part of an aircraft beacon device as illustrated in FIG. 2.

FIG. 3 shows this omnidirectional emission section 310 in two drive variants. The upper variant, variant a) or FIG. 3a shows the driving of all three LEDs 350, 351 and 352, which to this extent also stand representatively for the corresponding lighting rings 340, 341 and 342. For illustration, three beam cones 360, 361 and 362 are shown, which come from a light-emitting diode 350, 351 and 352, respectively. These three beam cones 360, 361 and 362 then reach the lens section 320. The position of the light-emitting diodes 350, 351 and 352, respectively, with respect to the lens section 320 then gives an emission range with a central emission direction 370, 371 and 372, respectively, with corresponding emission angles 380, 381 and 382, respectively. In this case, the light-emitting diode 350 is assigned the central emission direction 370 with the emission angle 380. For this upper light-emitting diode 350, this leads to a central emission direction 370 which is directed downwards and therefore has a negative emission angle 380. The central light-emitting diode 351 therefore has a horizontal central emission direction 371, and thus an emission angle 381 which has the value zero. The light-emitting diode 352 arranged further below correspondingly has a central emission direction which is directed upwards with a positive emission angle 382.

For this case a) or FIG. 3a, there is therefore a widely spread emission characteristic which emits significantly upwards and significantly downwards.

Variant b) or FIG. 3b drives only the lower light-emitting diode 352, or the corresponding lighting ring, which leads only to the lower emission cone 362 and consequently also only to the upwardly directed central emission direction 372 with the emission angle 382. The emission characteristic of the omnidirectional emission section 310 is therefore directed upwards overall.

As considered from the outside, or by a remote observer or from a remote observation point, the omnidirectional emission section 310, and when only this omnidirectional emission section of the aircraft beacon device is driven, the entire aircraft beacon device, therefore emits in a wide range. In the lower case, the omnidirectional emission section 310, or the entire aircraft beacon device, only emits upwards.

The characteristic of the aircraft beacon device can thus be influenced as a whole by correspondingly controlled driving of the lighting, and in particular in a focused fashion by the driving of the lighting rings. This influence by of the driving makes it possible both to specify fixed characteristics, for example in order to satisfy regionally different requirements, and carry out dynamic adjustments. Such dynamic adjustments may, inter alia, be provided for event-dependent adaptations as well as azimuthal readjustment or compensation for azimuthal readjustment of a nacelle of a wind power installation. Such a flexibly adjustable aircraft beacon device is suitable in particular for wind power installations because, on the one hand, great flexibility is required. On the other hand, wind power installations currently have the feature that they are not fully standardized, but are substantially standardized and can be installed in very different regions. Similar or almost identical wind power installations can therefore be provided for entirely different regions and also be fitted with the same aircraft beacon devices. This fitting may even be carried out before the region in which the respective wind power installation is to be delivered has been established, that is to say before it has been established which regulations the aircraft beacon device must eventually comply with. This naturally also includes the case that the delivery of a wind power installation to a particular location, and therefore to a particular region, has been established but for unforeseeable reasons a modification is carried out and this wind power installation is suddenly delivered to a different place. For the aircraft beacon device, this is no longer a problem. It merely needs to be adapted accordingly by programming.

Figure 4:
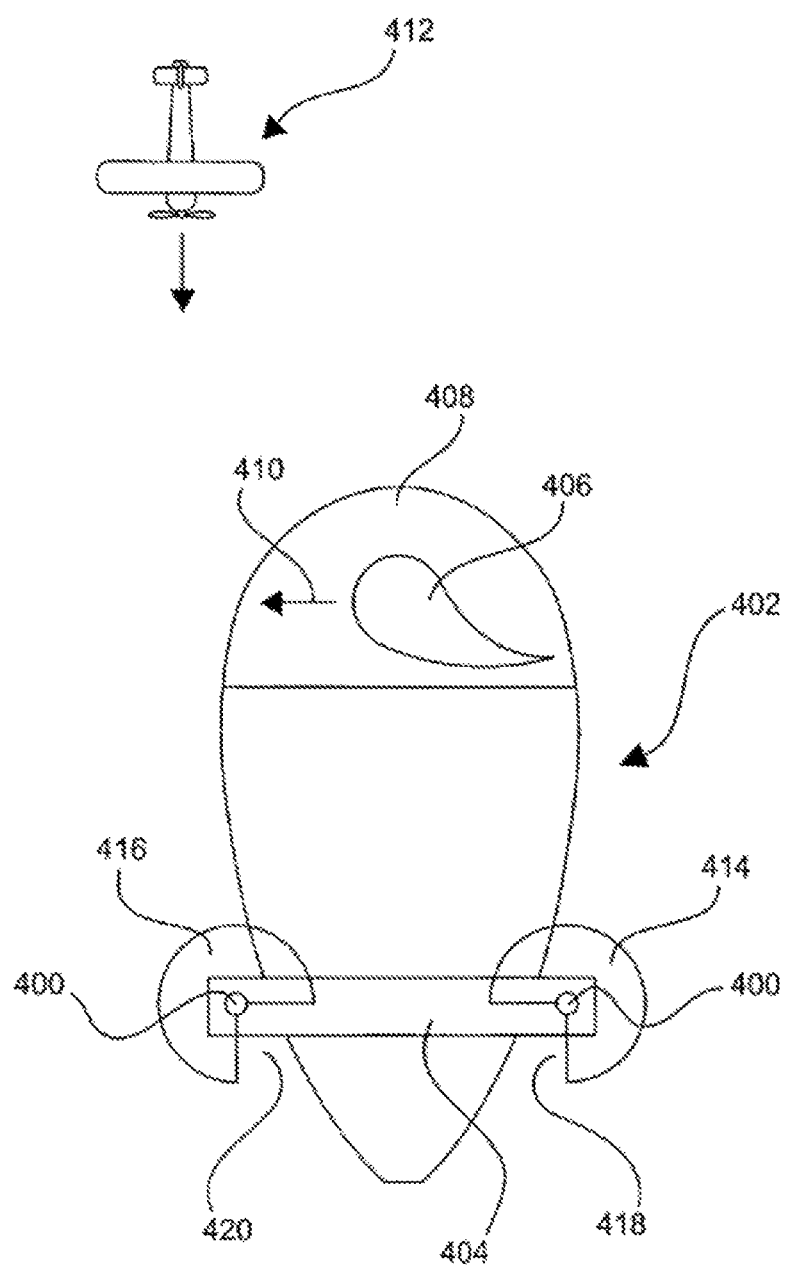
FIG. 4 schematically shows a wind power installation nacelle in plan view.

FIG. 4 schematically shows a wind power installation nacelle 402 in a plan view with two aircraft beacon devices 400. The aircraft beacon devices 400 are installed on an instrument support 404, which is located above the nacelle 402 and is also accessible for maintenance purposes.

FIG. 4 shows only one of three rotor blades 406 of the nacelle 402 for illustration, namely in a 12 o'clock position. The rotor blade 406 together with the spinner 408 is arranged so as to be rotatable with respect to the rest of the nacelle 402. Because of the wind, the rotor blade 406 rotates in the rotation direction 410 denoted by an arrow. When an aircraft 412, which is represented in this case only symbolically and at an unrealistically short distance, approaches, one of the aircraft beacon devices 400 may be shadowed by the rotor blade 406. Which of the two is shadowed, if one of them is shadowed at all, depends on the setting of the rotor blade 406 and the position of the observer, i.e., symbolically of the aircraft 412 in this case.

Such a problem of being covered by the rotor blade 406 arises, however, only for objects which are in front of the wind power installation, i.e., those which are in front of the nacelle 402. If such objects lie behind the wind power installation or the nacelle 402, they can always see both aircraft beacon devices 400. It is therefore only necessary for the two aircraft beacon devices 400 to emit in the forward direction, i.e., for double illumination to be provided. In the backward direction, double illumination by two aircraft beacon devices 200 is not absolutely necessary. One possibility then consists in each of the aircraft beacon devices emitting 180° in the forward direction, in order to achieve double illumination there because of the problem of the shadowing by the rotor blade 406. In the backward direction, the two aircraft beacon devices may respectively illuminate 90°, so that together they illuminate 180° in the backward direction, but not doubly. In order to illustrate this, an illumination sector 414 and 416, respectively, is indicated for the two aircraft beacon devices. Each illumination sector 414 and 416 therefore illuminates 270°. Likewise, the two aircraft beacon devices correspondingly have a blind sector 418 and 420, respectively, which they do not illuminate.

The illumination of the illumination sectors 414 and 416 can now be achieved straightforwardly by the lighting or lighting groups of the aircraft beacon devices 400 being driven accordingly.

Figure 5:
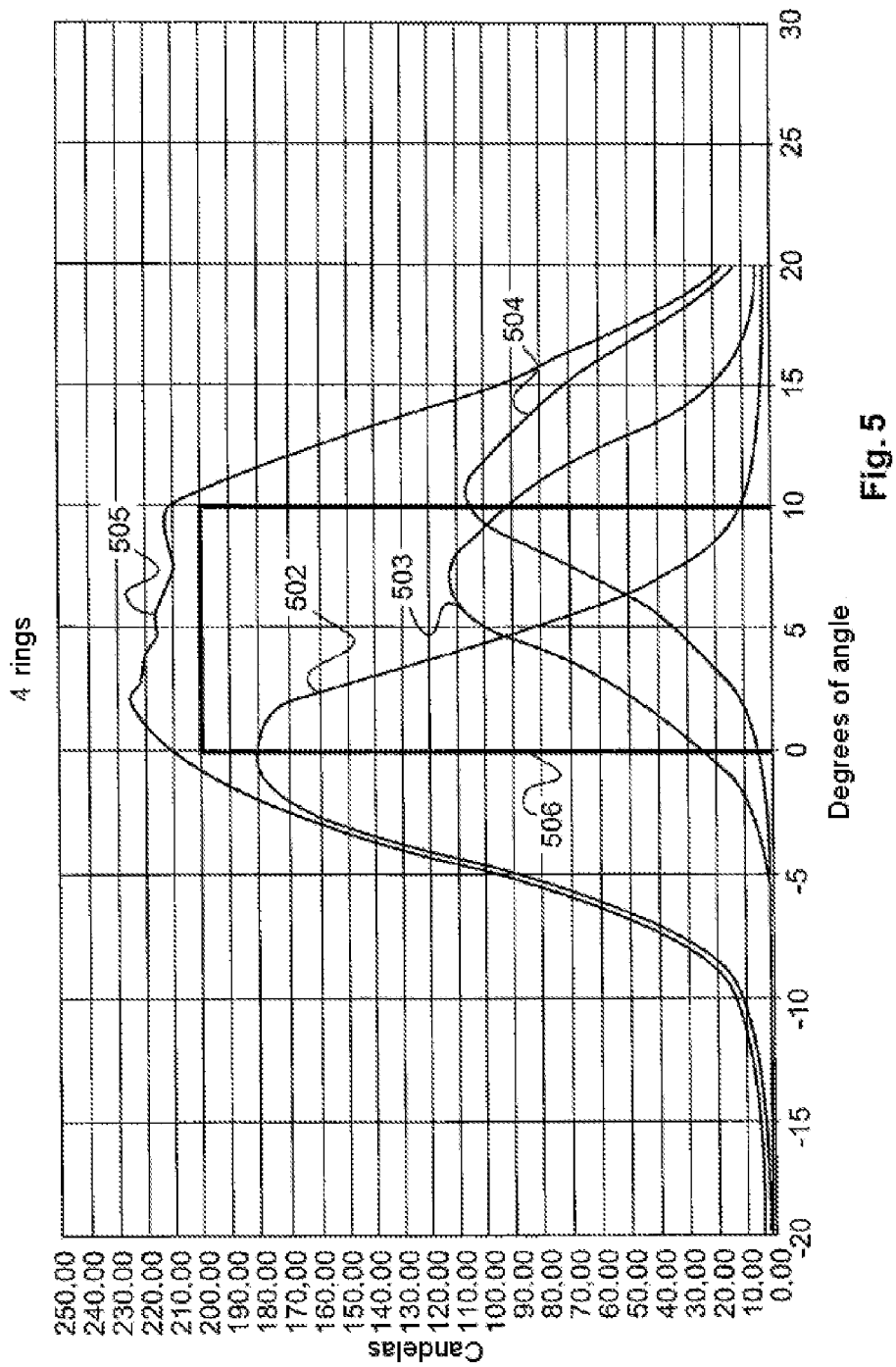
FIG. 5 shows by way of example one vertical emission characteristic of an omnidirectional emission section.

FIG. 5 shows by way of example a vertical emission characteristic of an omnidirectional emission section which has four axially separated lighting rings. The luminous intensity in candelas (Cd) is plotted on the ordinate as a function of the vertical angle ranges on the abscissa. The value 0 here denotes the respective beam plane and negative values are in this case upwardly directed directions, although this may also be configured differently.

Of the four lighting rings, for the vertical emission characteristic shown in FIG. 5, only the second to fourth rings, counted from the bottom, are used, each of which induces one of the second to fourth individual characteristics 502-504 shown. The first ring may be used for a different characteristic. The overall characteristic 505, which is formed by the sum of the individual characteristics, is likewise indicated, as is a predetermined setpoint characteristic 506. It can be seen that the setpoint characteristic 506 can be complied with by the overall characteristic 505, which may also be referred to as the sum characteristic.

Figure 6:
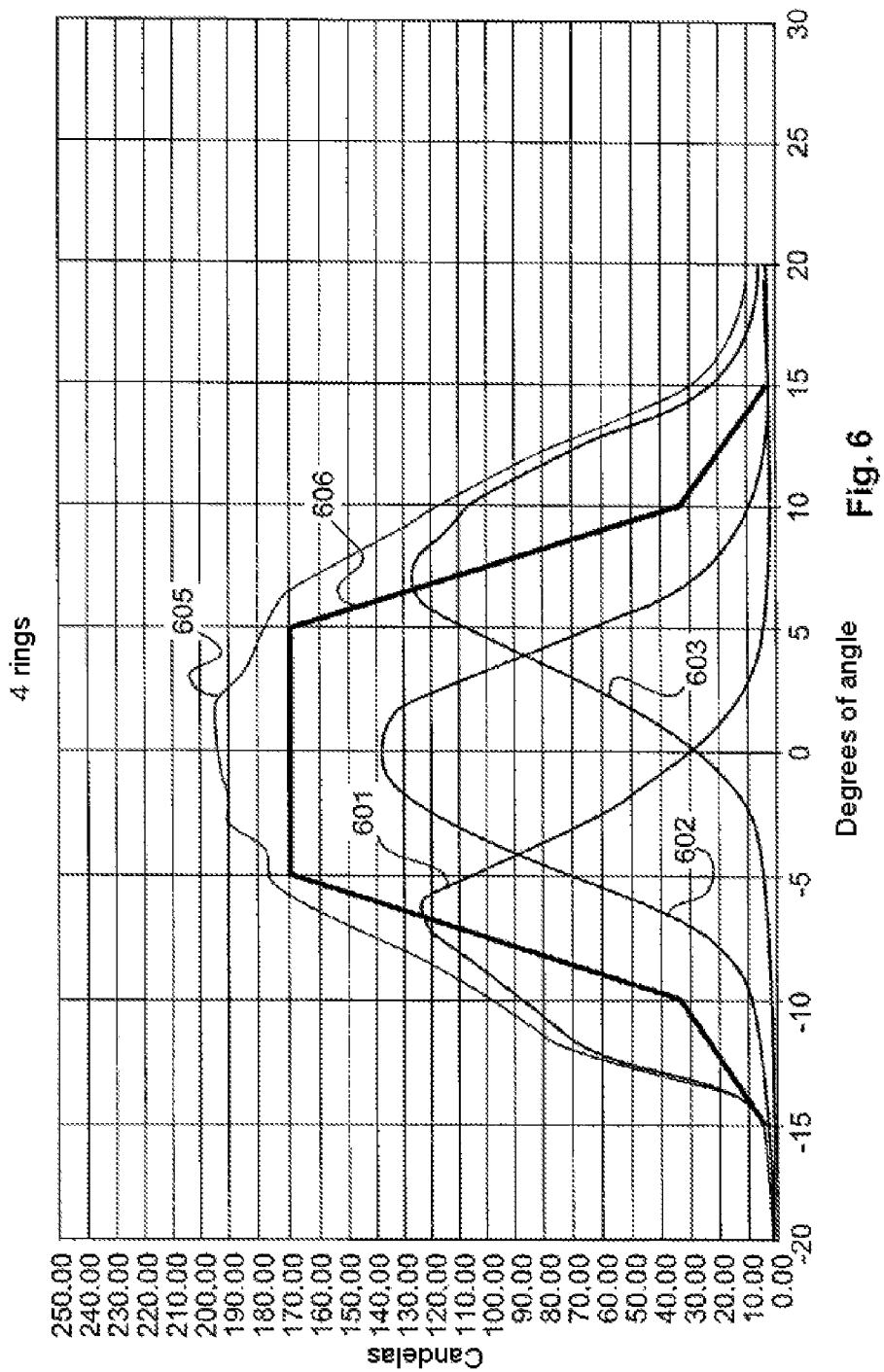
FIG. 6 shows by way of example another vertical emission characteristic of an omnidirectional emission section.

FIG. 6 shows vertical emission characteristics for the same omnidirectional emission section as in FIG. 5, but with different driving. Here, the first to third rings, counted from the bottom, are used. It can be seen that, in comparison with FIG. 5, a different overall characteristic 605 or sum characteristic 605 is obtained, which can comply with the setpoint characteristic 606 shown, which is likewise different here. The overall characteristic 605 or sum characteristic 605 is the sum of the individual characteristics 601 to 603.

It can also be seen that the individual characteristic 602 of the second ring has a higher intensity in comparison with the individual characteristic 502 of FIG. 5, which was also generated by the second ring.

It can therefore be seen that the respective overall characteristic or sum characteristic can be influenced or adjusted by selection of the driven rings, i.e., lighting rings, as well as by the intensity of the individual driving.

Therefore, which does not apply for the embodiments shown, a variable aircraft beacon is provided, which may also be referred to as an obstacle beacon or simply as a beacon.

Both the light intensity and the emission characteristic of the beacon can be varied.

This is done, in particular, by switching individual LEDs or LED groups on and/or off, and/or by different driving. By switching the individual LEDs or LED groups on and/or off, the emission characteristic is influenced in particular. In particular, the intensity may be influenced by different driving.

As the origin of the modification of the beacon properties, it is possible to use a sensor value, an automated specification, for example a timer, or direct instructions, for example via remote control devices.

One example of use is demand-controlled night identification. The beacons in this case illuminate to the necessary minimum in order not to disturb the residents and to ensure sufficient protection for the aircraft. When an aircraft is detected, the beacon switches to a maximum. This is only an example and it is also conceivable, for example, and is generally proposed as an embodiment, also to modify the intensity and/or emission characteristic during the day as a function of an event, such as the approaching aircraft mentioned by way of example, and in particular to adapt them to the event.

The utility model is intended to comprise solutions which are produced in a beacon or in a plurality of beacons.

It is particularly advantageous for the proposed beacon that it can be modified during continued operation. The proposed beacon can always adjust its setting again during normal operation.

Preferably, 4 omnidirectional emission sections are provided, so as to achieve high flexibility.

Preferably, respectively 4 lighting rings are provided in at least one omnidirectional emission section, in order to be able to produce even very different emission characteristics.

Figure 7:
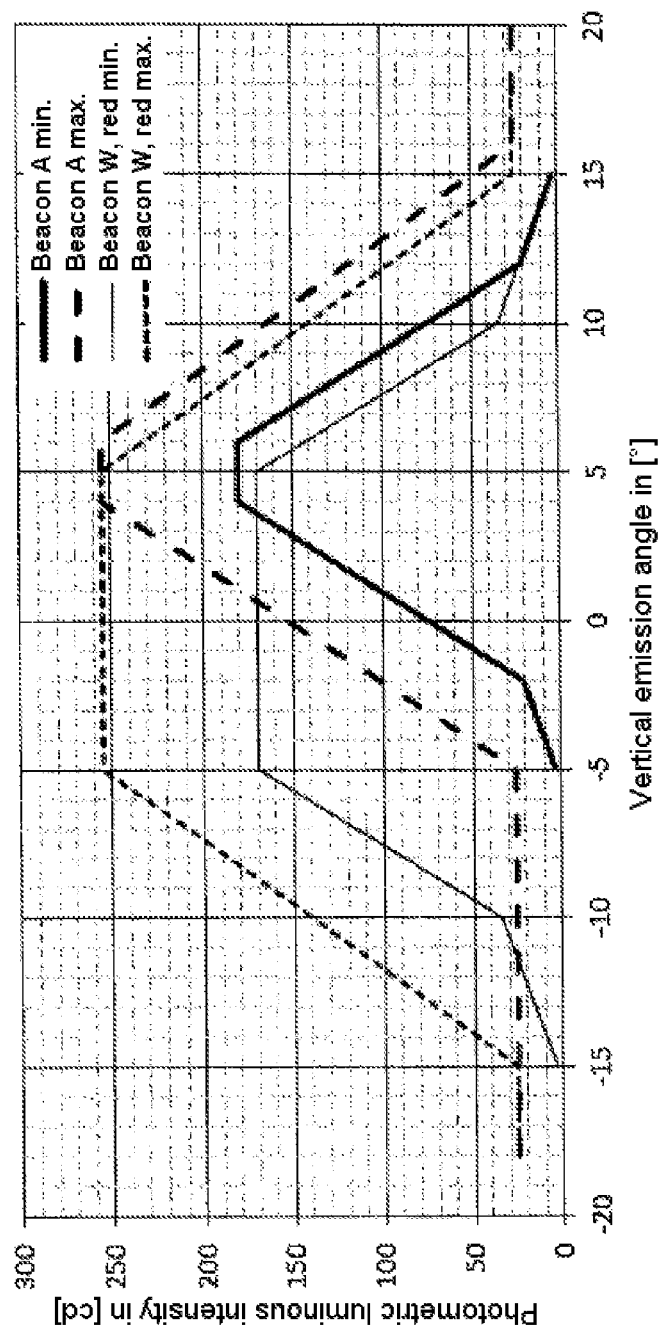
FIG. 7 schematically shows an emission characteristic only for emission upwards as a comparison.

FIG. 7 compares a preferred emission characteristic with a previous emission characteristic. The two characteristics are respectively denoted by an upper limit ("max" in dashes) and a lower limit (solid "min"), the respectively bolder lines relating to the new preferred characteristic. Positive values of the vertical emission angle in this case denote emission upwards, negative downwards, and 0° denotes a horizontal plane.

The specific emission characteristics respectively lie between the upper and lower limits. The previous emission characteristic is therefore distributed substantially uniformly around the horizontal plane, whereas the new preferred emission characteristic lies approximately around the value 5°, while scarcely lying in the negative range, i.e., scarcely emitting downwards. It is essentially limited to the upward range.

The invention claimed is:

1. An aircraft beacon device of a wind power installation, configured to be arranged on a nacelle of the wind power installation, the aircraft beacon device comprising:
   at least three omnidirectional emission sections arranged concentrically in a ring around a common mid-axis,
   each omnidirectional emission section comprising:
      a lens section arranged concentrically in a ring around the mid-axis, with a beam plane defined perpendicularly to the mid-axis, and
      at least one lighting ring having lights arranged concentrically in a ring around the mid-axis in order to emit light through the lens section,
   wherein each lighting ring is configured to emit light with a central emission direction that makes an emission angle with the beam plane, and wherein the emission direction depends on an axial position of the lighting ring with respect to the lens section,
   wherein at least one omnidirectional emission section comprises at least two lighting rings offset axially with respect to one another for emission with different emission angles.

2. The aircraft beacon device according to claim 1, wherein the omnidirectional emission sections are arranged in the axial direction with respect to one another.

3. The aircraft beacon device according to claim 1, wherein the lights are LEDs.

4. The aircraft beacon device according to claim 1, wherein at least one of the lights are configured to output light with a first color, and at least one further light is configured in order to output light with a second color.

5. The aircraft beacon device according to claim 1, wherein at least some of the lights are red LEDs and have a minimum intensity with a value from the following list:
   10 cd, 20 cd, 25 cd, 30 cd, 32 cd, 50 cd, 70 cd, 100 cd or 200 cd.

6. The aircraft beacon device according to claim 1, wherein at least some of the lights are white LEDs and have a minimum intensity with a value from the following list:
   3.4 cd, 34 cd or 175 cd.

7. The aircraft beacon device according to claim 1, comprising a control unit configured to vary emission characteristic of the aircraft beacon device by selective driving of individual lights or lighting rings.

8. The aircraft beacon device according to claim 1, comprising a control unit configured to adjust or vary an intensity of the lights or lighting rings.

9. The aircraft beacon device according to claim 7, wherein the control unit has emission characteristics that are programmed in a fixed manner.

10. The aircraft beacon device according to claim 7, wherein the control unit is configured to modify the emission characteristic during operation of the installation.

11. A wind power installation comprising:
   a nacelle; and
   at least one aircraft beacon device according to claim 1 arranged on the nacelle.

12. A method for operating an aircraft beacon device according to claim 1 comprising driving the lights in such a way that a predetermined emission characteristic is generated and/or is switched on and/or off in a predetermined sector.

13. The method according to claim 12, wherein properties of the emission of the aircraft beacon device are adjusted or modified during continuous operation by corresponding driving of the lights and/or the lighting rings.

14. The method according to claim 12 wherein at least one of:
   a vertical emission characteristic,
   a horizontal sector for emission, and
   an emission intensity
   is adjusted or modified during continuous operation as a function of a period of time or point in time.

15. The method according to claim 12, wherein an emission characteristic is specified by establishing the driving of the lights and the lighting rings, before the aircraft beacon device is put into operation.

16. The method according to claim 12, wherein the aircraft beacon device, when installed on a nacelle of a wind power installation, is readjusted as a function of the azimuthal position of the nacelle, and an emission characteristic varying in the horizontal direction is adapted according to the azimuthal position of the nacelle during continuous operation.

* * * * *